United States Patent
Chen et al.

(10) Patent No.: US 11,455,449 B2
(45) Date of Patent: Sep. 27, 2022

(54) METHOD FOR DETERMINING IC VOLTAGE AND METHOD FOR FINDING RELATION BETWEEN VOLTAGES AND CIRCUIT PARAMETERS

(71) Applicant: REALTEK SEMICONDUCTOR CORPORATION, Hsinchu (TW)

(72) Inventors: Ying-Chieh Chen, Keelung (TW); Mei-Li Yu, Hsinchu (TW); Yu-Lan Lo, Hsinchu County (TW); Hsin-Chang Lin, Hsinchu County (TW); Shu-Yi Kao, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 475 days.

(21) Appl. No.: 16/667,121

(22) Filed: Oct. 29, 2019

(65) Prior Publication Data
US 2020/0151295 A1     May 14, 2020

(30) Foreign Application Priority Data
Nov. 8, 2018 (TW) ................................ 107139648

(51) Int. Cl.
*G06F 30/3312* (2020.01)
*G06F 30/327* (2020.01)
*G06F 119/12* (2020.01)

(52) U.S. Cl.
CPC ........ *G06F 30/3312* (2020.01); *G06F 30/327* (2020.01); *G06F 2119/12* (2020.01)

(58) Field of Classification Search
CPC ............... G06F 30/3312; G06F 30/327; G06F 2119/12; G06F 2119/06; G06F 30/367;
(Continued)

(56) References Cited

U.S. PATENT DOCUMENTS

| 8,615,727 B2 | 12/2013 | Ghanta et al. |
| 8,884,685 B1 | 11/2014 | Petrovic |
| 2009/0031268 A1* | 1/2009 | Miranda ............. G06F 30/3312 716/113 |

FOREIGN PATENT DOCUMENTS

CN          103403719 A     11/2013

OTHER PUBLICATIONS

Science Direct, "Monte Carlo method", http://www.sciencedirect.com/topics/neuroscience/monte-carlo-method, Elsevier, 2018.

(Continued)

*Primary Examiner* — Paul Dinh
(74) *Attorney, Agent, or Firm* — WPAT, PC

(57) ABSTRACT

Disclosed is an IC voltage determining method including: executing a static timing analysis according to a circuit design to obtain data of a critical path and then generating a netlist; executing a circuit parameter simulation and Monte Carlo simulation with the netlist according to a regular voltage and prescribed parameters to obtain a circuit parameter reference value and a variance of circuit parameter values; executing an adaptive voltage scaling analysis according to a voltage range to obtain a voltage-versus-parameter relation indicative of the number of times that each of circuit parameter deviations that are respectively associated with predetermined voltages within the predetermined voltage range is of the variance; and testing an IC according to the regular voltage to obtain a circuit parameter test value and determining the IC voltage according to the voltage-versus-parameter relation and a difference between the circuit parameter test value and the circuit parameter reference value.

12 Claims, 4 Drawing Sheets

(58) Field of Classification Search
CPC ............. G06F 2111/08; G06F 30/3308; G06F 30/3315; G06F 30/20; G06F 30/33; G06F 30/323
USPC ........................................................ 716/113
See application file for complete search history.

(56) References Cited

OTHER PUBLICATIONS

Wu, "STA Analysis", http://codebeauty.blogspot.tw/2011/08/know-static-timing-analysis.html, Apr. 18, 2018, StorArt.
OA letter of counterpart TW application of application No. 107139648 dated Sep. 19, 2019. Summary of the OA letter.

* cited by examiner

METHOD FOR DETERMINING IC VOLTAGE AND METHOD FOR FINDING RELATION BETWEEN VOLTAGES AND CIRCUIT PARAMETERS

BACKGROUND OF THE INVENTION

1. Field of the Invention

The present invention relates to a method for determining a voltage, especially to a method for determining an IC voltage and a method for finding a relation between voltages and circuit parameters.

2. Description of Related Art

The current techniques for the analysis of the influence of production yield or signal transmission delay related to process variation have the following problems:
(1) When executing a simulation according to different process variances/models under the setting of a constant voltage, the result of the simulation usually shows that the deviation of signal transmission delay leads to the failure in the function of an integrated circuit (IC) or causes the IC to fail to pass a test.
(2) Using process variances/models for analysis is confined to a constant voltage because it is hard/impossible to use an adaptive voltage scaling technique to analyze the influence of signal transmission delay related to process variation.
(3) It costs a lot of time to carry out characterization with all kinds of variances/models for every component on a critical path of an IC.
(4) The analysis using a characterization library model is different from a critical path circuit simulation by 0~5 percent.

SUMMARY OF THE INVENTION

An object of the present invention is to provide a method for determining an IC voltage and a method for finding a relation between voltages and circuit parameters as improvements over the prior art.

An embodiment of the method of the present invention includes the following steps: executing a static timing analysis according to a circuit design to obtain data of a critical path of the circuit design, and then generating a netlist according to the data of the critical path; executing a circuit parameter simulation and a Monte Carlo simulation with the netlist according to a regular voltage and prescribed parameters, and thereby obtaining a circuit parameter reference value and a variance of circuit parameter values; executing an adaptive voltage scaling analysis according to a predetermined voltage range, and thereby obtaining a voltage-versus-parameter relation, the voltage-versus-parameter relation indicative of the number of times that each of circuit parameter deviations that are respectively associated with predetermined voltages within the predetermined voltage range is of the variance; and testing an integrated circuit (IC) according to the regular voltage to obtain a circuit parameter test value of the IC, and then determining an IC voltage supplied to the IC according to the voltage-to-parameter relation and a value difference between the circuit parameter test value and the circuit parameter reference value.

An embodiment of the method of the present invention for finding a relation between voltages and circuit parameters includes the following steps: executing a static timing analysis according to a circuit design to obtain data of a critical path of the circuit design, and then generating a netlist according to the data of the critical path; executing a circuit parameter simulation and a Monte Carlo simulation with the netlist according to a regular voltage and prescribed parameters, and thereby obtaining a circuit parameter reference value and a variance; and executing an adaptive voltage scaling analysis according to a predetermined voltage range, and thereby obtaining a voltage-versus-parameter relation, the voltage-versus-parameter relation indicative of the number of times that each of circuit parameter deviations that are respectively associated with predetermined voltages within the predetermined voltage range is of the variance.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The following description is written by referring to terms acknowledged in this technical field. If any term is defined in the following description, such term should be explained accordingly. In addition, the embodiments and the exemplary implementations thereof in the following description are disclosed for the understanding and implementation of the present invention without intent to limit the present invention; in other words, the equivalent and practicable modification of the above-mentioned embodiments and exemplary implementations are within the scope of the present invention.

The present invention discloses a method for determining an integrated circuit (IC) voltage and a method for finding a relation between voltages and circuit parameters. The methods of the present invention can save designers a lot of time for research and development and increase production yield.

Figure 1:
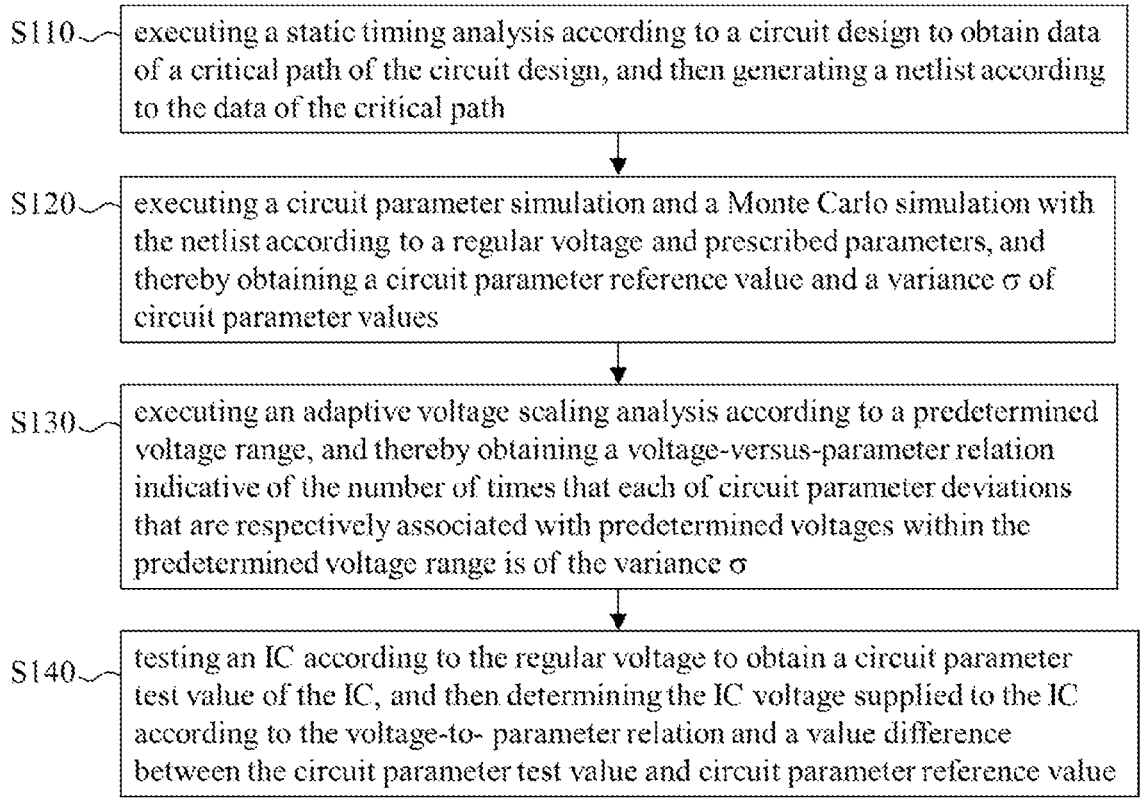
FIG. 1 shows an embodiment of the method of the present invention for determining an IC voltage.
Figure 2:
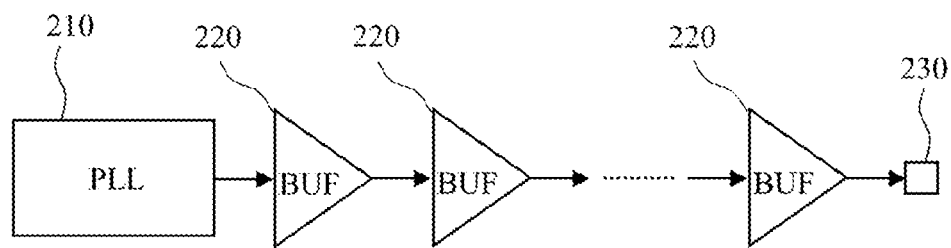
FIG. 2 shows an embodiment of the critical path mentioned in the embodiment of FIG. 1.
Figure 3:
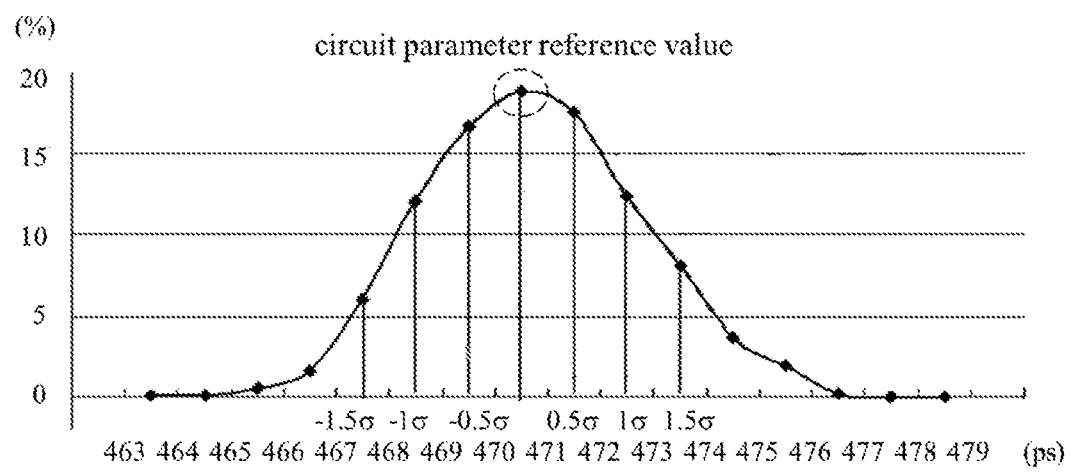
FIG. 3 shows an exemplary probability distribution composed of the circuit parameter values mentioned in the embodiment of FIG. 1.
Figure 4:
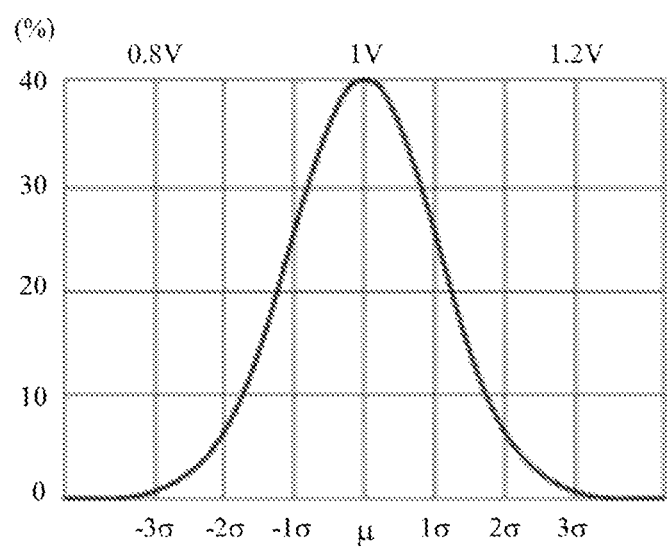
FIG. 4 shows an instance of the voltage-versus-parameter mentioned in the embodiment of FIG. 1.

FIG. 1 shows an embodiment of the method of the present invention for determining an IC voltage. This embodiment includes the following steps:

step S110: executing a static timing analysis (STA) according to a circuit design to obtain data of a critical path of the circuit design, and then generating a netlist (e.g., a netlist generated by a known software such as "SPICE (Simulation Program with Integrated Circuit Emphasis)") according to the data of the critical path. In an exemplary implementation, the circuit design includes a plurality of signal transmission paths, and the one causing the maximum signal transmission delay among these signal transmission paths is treated as the critical path; for instance, as shown in FIG. 2, a critical path 200 includes a phase-locked loop (PLL) 210, a plurality of buffers (BUF) 220, and an output pin 230, in which the phase-locked loop 210 and the buffers 220 are configured to receive a voltage (e.g., the below-mentioned regular voltage or the IC voltage supplied to an IC) and a clock (not shown) for operation, and the critical path 200 is configured to transmit a signal from the phase-locked loop 210 to the output pin 230. The aforementioned static timing analysis and generation of the netlist are well known in this technical field; the static timing analysis and the generation of the netlist are respectively found in the following references: "http://codebeauty.blogspot.tw/2011/08/know-static-timing-analysis.html" and "https://www.yumpu.com/en/document/view/11196829/cell-characterization-conce pts-silvaco".

step S120: executing a circuit parameter simulation and a Monte Carlo simulation with the netlist according to a regular voltage (e.g., one volt (1V), or a voltage suitable for the circuit design and its manufacturing processes) and prescribed parameters, and thereby obtaining a circuit parameter reference value and a variance $\sigma$ of circuit parameter values. In an exemplary implementation, the prescribed parameters include a plurality of process parameters; in another exemplary implementation, the prescribed parameters not only include the process parameters, but also include at least one of the following parameters: a slew parameter of the critical path, a load parameter of the critical path, and an IR drop (a.k.a. voltage drop) parameter, in which the definitions of the slew parameter, the load parameter, and the IR drop parameter are well known in this technical field. In an exemplary implementation, the circuit parameter simulation is a process corner simulation such as a typical-typical corner (TT corner) simulation; TT corner relates to the switching speeds of a standard NMOS transistor and PMOS transistor, and the definition of TT corner is well known in this technical field. In an exemplary implementation, the circuit parameter reference value is a TT corner value related to a signal transmission delay parameter. In an exemplary implementation, the circuit parameter reference value generated by the execution of the circuit parameter simulation and the circuit parameter values generated by the execution of the Monte Carlo simulation belong to the same type of parameter values; for instance, the circuit parameter reference value is a signal transmission delay reference value and the circuit parameter values are a plurality of signal transmission delay values, in which the signal transmission delay values can be illustrated with a probability distribution chart as FIG. 3. The horizontal axis of FIG. 3 stands for delay time (unit: ps (picosecond)), the vertical axis of FIG. 3 stands for probability (unit:percent), the variance $\sigma$ of the signal transmission delay values is 2.035 ps, and each of the diamonds on the distribution curve of FIG. 3 stands for the probability of a signal transmission delay value being an integral/non-integral multiple of the variance $\sigma$. The aforementioned process corner simulation and the Monte Carlo simulation are well known in this technical field, in which the Monte Carlo simulation is found in the following reference "https://www.sciencedirect.com/topics/neuroscience/monte-carlo-method".

step S130: executing an adaptive voltage scaling analysis (AVS) according to a predetermined voltage range, and thereby obtaining a voltage-versus-parameter relation, the voltage-versus-parameter relation indicative of the number of times that each of circuit parameter deviations that are respectively associated with predetermined voltages within the predetermined voltage range is of the variance $\sigma$. In an exemplary implementation, the predetermined voltage range is from 80% of the aforementioned regular voltage to 120% of the regular voltage (e.g., 0.8V~1.2V if the regular voltage is 1V); the predetermined voltages are at 0.01V intervals (e.g., 0.8V, 0.81V, 0.82V, ..., 1.18V, 1.19V, and 1.2V); for each predetermined voltage, the adaptive voltage scaling analysis is used to obtain a TT corner value/an average value of one or more circuit parameters (e.g., a signal transmission delay parameter) with the circuit parameter simulation/ Monte Carlo simulation executed according to the predetermined voltage, and used to find out the number of times that a circuit parameter deviation (i.e., one of the aforementioned circuit parameter deviations) is of the variance $\sigma$ according to the difference between the aforementioned circuit parameter reference value and the TT corner value/average value so that a voltage-to-parameter relation as shown in FIG. 4 can be obtained according to all of the circuit parameter deviations respectively related to all of the predetermined voltages. In an exemplary implementation, a circuit parameter deviation related to a certain predetermined voltage equals to the difference between the circuit parameter reference value and the TT corner value/average value related to the same predetermined voltage.

step S140: testing an IC according to the regular voltage to obtain a circuit parameter test value of the IC, and then determining the IC voltage supplied to the IC according to the voltage-to-parameter relation and a value difference between the circuit parameter test value and the circuit parameter reference value. For instance, providing the regular voltage is 1V, the circuit parameter reference value is a delay value 367 ps, the circuit parameter test value is a delay value 392 ps, the variance $\sigma$ is 9 ps, and the voltage-to-parameter relation indicates that two (i.e., +2) units of the variances $\sigma$ is associated with 1.13V and three (i.e., +3) units of the variances $\sigma$ is associated with 1.2V, the value difference 25 ps (i.e., 392 ps-367 ps) will approximate to 2.78 units of the variance $\sigma$; since one can find out 2.78 units of the variance $\sigma$ is associated with 1.1846V by interpolation, the IC voltage can be determined to be 1.1846V; Under the setting of this IC voltage, the difference between a circuit parameter actual value (e.g., a delay value 370 ps) of the IC and the circuit parameter reference value 367 ps will be less than the value difference between the circuit parameter test value 392 ps and the circuit parameter reference value 367 ps, and thus the performance of the IC with the IC voltage 1.1846V will meet the requirements of a test. In the above instance, a voltage difference between the regular voltage and the IC voltage is proportional to the value difference.

It should be noted that steps S110~S130 of FIG. 1 can be used for finding out a relation (e.g., FIG. 4) between voltages and circuit parameters while step S140 of FIG. 1 is optional so that one can use the relation according to other demands for implementation.

It should be noted that people of ordinary skill in the art can implement the present invention by selectively using some or all of the features of any embodiment in this specification or selectively using some or all of the features of multiple embodiments in this specification as long as this implementation is practicable, which implies that the present invention can be carried out flexibly.

To sum up, the present invention can determine an IC voltage and find out a relation between voltages and circuit parameters, and achieve the advantages of reducing the time for research and development and increasing IC production yield.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A method, comprising:
executing a static timing analysis (STA) according to a circuit design to obtain data of a critical path of the circuit design, and then generating a netlist according to the data of the critical path;
executing a circuit parameter simulation and a Monte Carlo simulation with the netlist according to a regular voltage and prescribed parameters, and thereby obtaining a circuit parameter reference value and a variance of circuit parameter values;
executing an adaptive voltage scaling (AVS) analysis according to a predetermined voltage range, and thereby obtaining a voltage-versus-parameter relation, the voltage-versus-parameter relation indicative of a number of times that each of circuit parameter deviations that are respectively associated with predetermined voltages within the predetermined voltage range is of the variance; and
testing an integrated circuit (IC) according to the regular voltage to obtain a circuit parameter test value of the IC, and then determining an IC voltage supplied to the IC according to the voltage-versus-parameter relation and a value difference between the circuit parameter test value and the circuit parameter reference value.

2. The method of claim 1, wherein the regular voltage is within the predetermined voltage range.

3. The method of claim 1, wherein the circuit parameter simulation is a process corner simulation.

4. The method of claim 3, wherein the circuit parameter simulation is a typical-typical corner (TT corner) simulation.

5. The method of claim 1, wherein both the circuit parameter reference value and the circuit parameter test value are signal transmission delay values of the critical path.

6. The method of claim 1, wherein a voltage difference between the regular voltage and the IC voltage is proportional to the value difference.

7. The method of claim 1, wherein the prescribed parameters include a plurality of process parameters and at least one of following parameters: a slew parameter of the critical path; a load parameter of the critical path; and an IR drop parameter.

8. The method of claim 1, wherein a circuit parameter actual value of the IC under the IC voltage, the circuit parameter test value, and the circuit parameter reference value belong to a same type of parameter values, and an actual parameter difference between the circuit parameter actual value and the circuit parameter reference value is less than the value difference between the circuit parameter test value and the circuit parameter reference value.

9. A method, comprising:
executing a static timing analysis (STA) according to a circuit design to obtain data of a critical path of the circuit design, and then generating a netlist according to the data of the critical path;
executing a circuit parameter simulation and a Monte Carlo simulation with the netlist according to a regular voltage and prescribed parameters, and thereby obtaining a circuit parameter reference value and a variance; and
executing an adaptive voltage scaling (AVS) analysis according to a predetermined voltage range, and thereby obtaining a voltage-versus-parameter relation, the voltage-versus-parameter relation indicative of a number of times that each of circuit parameter deviations that are respectively associated with predetermined voltages within the predetermined voltage range is of the variance.

10. The method of claim 9, wherein the circuit parameter simulation is a process corner simulation.

11. The method of claim 1, wherein the predetermined voltage range is from 80% of the regular voltage to 120% of the regular voltage; and the predetermined voltages within the predetermined voltage range are at regular intervals.

12. The method of claim 9, wherein the predetermined voltage range is from 80% of the regular voltage to 120% of the regular voltage; and the predetermined voltages within the predetermined voltage range are at regular intervals.

* * * * *